United States Patent [19]
Kawanabe

[11] Patent Number: 5,522,023
[45] Date of Patent: May 28, 1996

[54] METHOD FOR REPRESENTING CHARACTERS CONSTRUCTING TEXTS IN DOT PATTERN AND MODIFYING THE DOT DENSITY AND TRANSMITTING TEXTS

[75] Inventor: Tetsuya Kawanabe, Yokohama, Japan

[73] Assignee: Canon Kabushiki Kaisha, Tokyo, Japan

[21] Appl. No.: 388,888

[22] Filed: Feb. 14, 1995

Related U.S. Application Data

[63] Continuation of Ser. No. 777,168, Oct. 16, 1991, abandoned.

[30] Foreign Application Priority Data

Oct. 17, 1990 [JP] Japan ................................ 2-276161

[51] Int. Cl.⁶ .................................................. G06T 3/40
[52] U.S. Cl. ........................ 395/150; 395/151; 395/128; 345/129
[58] Field of Search .................................. 395/128, 150, 395/151; 345/124–130, 132, 143, 202, 192–195; 382/56, 232; 358/426, 428, 448–49, 451–52, 470

[56] References Cited

U.S. PATENT DOCUMENTS

| | | | |
|---|---|---|---|
| 4,242,678 | 12/1980 | Somerville | 340/728 |
| 4,338,673 | 7/1982 | Brown | 364/523 |
| 5,093,903 | 3/1992 | Sudoh et al. | 395/102 |
| 5,097,518 | 3/1992 | Scott et al. | 382/47 |
| 5,271,072 | 12/1993 | Yoshida et al. | 382/56 |

*Primary Examiner*—Heather R. Herndon
*Assistant Examiner*—Joseph H. Feild
*Attorney, Agent, or Firm*—Fitzpatrick Cella Harper & Scinto

[57] ABSTRACT

A method for representing characters constructing texts in a dot pattern and modifying the dot density to transmission. The method is realized by transmitting texts according to steps of storing characters constructing a text in a character code, developing the character code to an outputting dot pattern, converting a dot density of the dot pattern correspondingly to a resolution for transmission, and transmitting information according to the dot pattern having the dot density converted as above. The method is then effected by a text transmitting apparatus comprising an input unit for inputting characters, a memory for storing a text consisting of the inputted characters in a character code, a developing unit for developing the character code to an outputting dot pattern, a converter for converting a dot density of the dot pattern, and a transmission controller for controlling transmission of the converted dot pattern.

8 Claims, 8 Drawing Sheets

METHOD FOR REPRESENTING CHARACTERS CONSTRUCTING TEXTS IN DOT PATTERN AND MODIFYING THE DOT DENSITY AND TRANSMITTING TEXTS

This application is a continuation, of application Ser. No. 07/777,168, filed Oct. 16, 1991, now abandoned.

BACKGROUND OF THE INVENTION

1. Field of the Invention

The present invention relates to a text processing apparatus for converting b density of patterns for displaying or printing edited texts for transmission to a facsimile.

2. Related Background Art

Generally, for transmitting a text edited on a text processing apparatus to a remote place, the edited text is first printed on a form or the like, and then the printed text is read by a facsimile (hereinafter called FAX).

However, in recent years, devices such as modems and the like become cheap to obtain, and thus a text processing apparatus is available having a FAX function to output a text edited on the text processing apparatus directly to a remote FAX without printing by way of a telephone circuit.

For transmitting the text directly to the FAX as mentioned, it is necessary that each character of the text be converted into a facsimile image represented in a dot pattern. Therefore a prior art apparatus utilizes printing font data to output straight, or is provided with character font data for exclusive use on a facsimile corresponding to each character, thereby realizing a transmission.

However, in the above prior art, since a dot density of the printing character font data utilize is determined by the type of the printer, the printing character font data and the facsimile image are different in dot density in most cases. Thus, where a dot density of the printing character font data is low as compared with the facsimile image, an image to be outputted to a destined facsimile is reduced to be smaller in size to recording than the image printed out by such apparatus and therefore the transmitted text is hard to identify. On the other hand, where the former is higher in dot density than the latter, an image to be outputted to the destined facsimile is enlarged for recording, and therefore the text can only be partly transmitted for printing out on a form of the same size.

Then, in an apparatus for transmitting texts if the character font data is provided for exclusive use on a facsimile, the image to be outputted to a destined facsimile can be made almost equal in size to the image printed out. However, if many kinds and sizes of characters are utilized, then a multiplicity of character font data for facsimile will be required, thus increasing the memory requirements for storing font data unavoidably.

SUMMARY OF THE INVENTION

An object of the present invention is to provide an apparatus capable of transmitting texts according to a dot pattern in a density appropriate for a facsimile without providing exclusive font data particularly therefor.

Another object of the present invention is to provide an apparatus capable of transmitting texts to a facsimile by modifying a dot density of a dot pattern of characters to be printed.

According to one aspect, the present invention which achieves these objects relates to a method for transmitting texts, comprising the steps of storing characters constructing a text in a character code, developing the character code to an outputting dot pattern, converting a dot density of the dot pattern correspondingly to a resolution of a transmitter, transmitting information by the transmitter according to the dot pattern having the density converted.

According to another aspect, the present invention which achieves these objects relates to an apparatus for transmitting texts, comprising input means for inputting characters, memory means for storing a text consisting of the characters inputted from the input means in a character code, development means for developing the character code to an outputting dot pattern, conversion means for converting a dot density of the dot pattern correspondingly to a resolution for transmission, transmission control means for controlling the dot pattern converted by the conversion means for transmission.

According to still another aspect, the present invention which achieves these objects relates to an apparatus for transmitting texts, comprising a first processing unit having input means for inputting characters and instructions, first memory means for storing a text consisting of the characters inputted from the input means in a character code, and development means for developing the character code to an outputting dot pattern, a second processing unit having second memory means for storing the dot pattern developed by the development means, second conversion means for converting a dot density of the dot pattern stored in the second memory means correspondingly to a resolution for transmission according to an instruction from the first processing unit, and transmission control means for controlling the dot pattern converted by the second conversion means for transmission, access control means for controlling an access of the first and second processing units to the second memory means.

Other objects and advantages besides those discussed above shall be apparent to those skilled in the art from the description of a preferred embodiment of the invention which follows. In the description, reference is made to the accompanying drawings, which form a part hereof, and which illustrate an example of the invention. However, such example is not exhaustive of the various embodiments of the invention, and therefore reference is made to the claims which follow the description for determinating the scope of the invention.

DESCRIPTION OF THE PREFERRED EMBODIMENTS

Preferred embodiments of the present invention will now be described with reference to the accompanying drawings.

Figure 1:
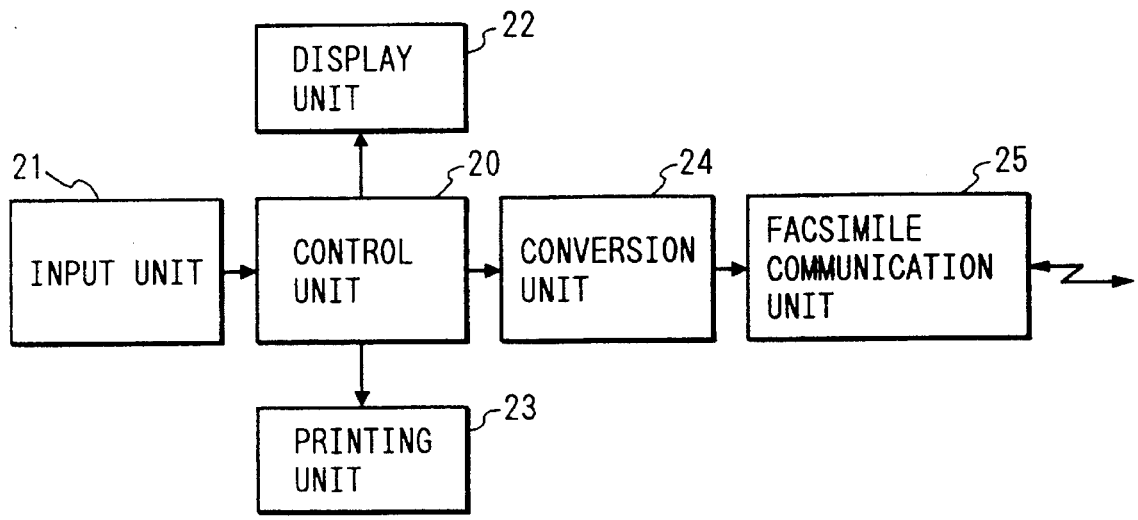
FIG. 1 is a block diagram showing a construction of a text processing apparatus given in one embodiment of the invention.
Figure 2:
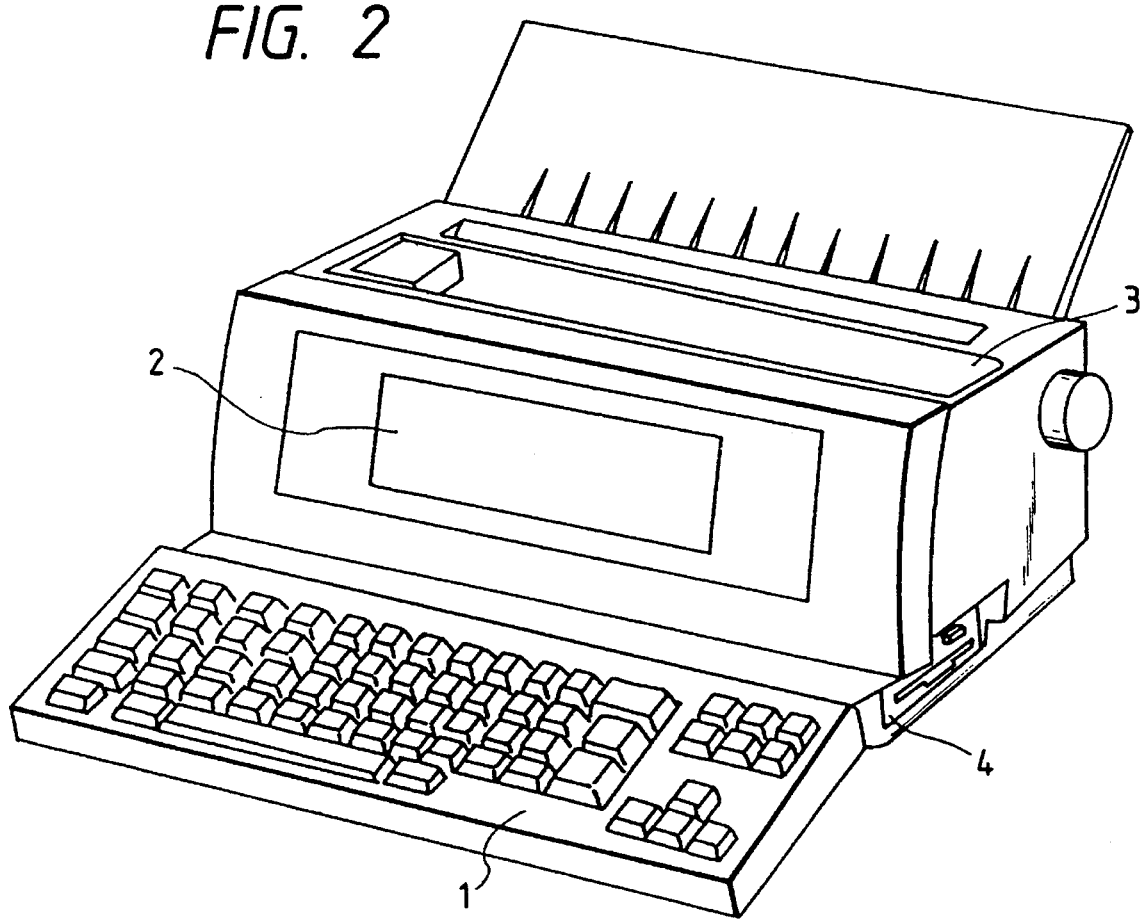
FIG. 2 is a surface appearance view of the text processing apparatus embodying the invention.

FIG. 1 is a block diagram showing a construction of a text processing apparatus given in one embodiment of the invention, and FIG. 2 is a surface appearance view of the text processing apparatus.

In FIG. 2, a reference numeral 1 denotes a keyboard as input means for inputting texts to such apparatus, 2 denotes a liquid crystal display (LCD) for displaying characters and texts inputted from the keyboard 1, 3 denotes a so-called dot matrix printer as recording means for constructing edited characters and symbols by dots, an ink jet (bubble jet) printer being employed in the embodiment. A reference numeral 4 denotes a flexible disk drive (hereinafter called FDD) for storing data of inputted and edited texts therein.

In FIG. 1, a reference numeral 21 denotes an input unit for managing and controlling an operating state of the keyboard 1 and others, which is ready for obtaining input characters and others on a control unit 20. A reference numeral 22 denotes a display unit for displaying inputted characters, edited texts and others from the input unit 21 on the LCD 2, which is controlled for display by information from the control unit 20 which will be described herein later. A reference numeral 23 denotes a printing unit for controlling printing and recording desired characters, texts and others on the printer 3, which operates according to requests from the control unit 20 described hereinlater. The control unit 20 controls the input unit 21, the display unit 22, the printing unit 23, the FDD 4 and others, operating for input of desired characters, texts and others, editing, printout, storage, FAX transmission described herein later and so forth. A reference numeral 24 denotes a conversion unit for converting a printing character font data into a dot density to be transmitted to a facsimile, and further encoding (for example, MH (Modified Huffman) encoding) to send to a GIII circuit of the facsimile. A reference numeral 25 denotes a facsimile communication unit as communication means, which is constructed of MODEM, NCU (Network Control Unit) and others, and operates for controlling communication of an encoded image data generated in the conversion unit 24 for transmission to a desired facsimile according to a facsimile transmission procedure (CCITT recommendations T.4, T.30).

Figure 3:
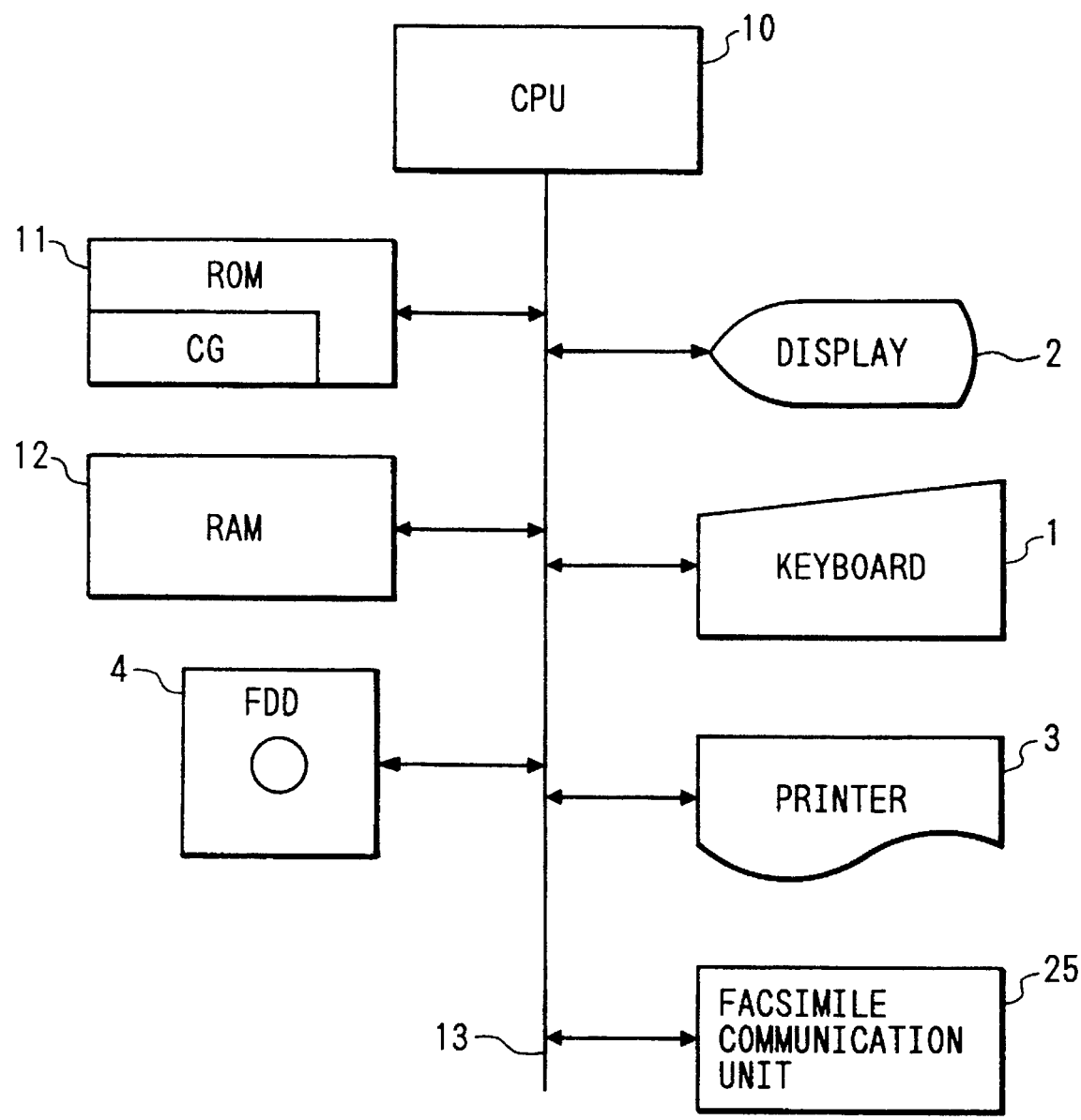
FIG. 3 is a drawing showing a hardware configuration of the text processing apparatus embodying the invention.

FIG. 3 shows a hardware configuration of the apparatus illustrated in FIG. 1.

In the drawing, a reference numeral 25 represents like portion in FIG. 1, and 1 to 3 represent like portions in FIG. 2. The control unit 20 is constructed of CPU 10, ROM 11, RAM 12 and FDD 4.

As size varying means, the CPU 10 specifies a varied size of the text to transmit, and is capable of transmitting an image size to a facsimile in three kinds coming in reduced size, equal size and enlarged size. Further, with a specified state of the varied size stored in the RAM 12 and others, the specified state may be identified by a conversion control operation. The RAM 12 is capable of storing a predetermined content during program running. The ROM 11 stores a program shown in FIG. 4, a program for the aforementioned control and others. Then, the ROM 11 is provided with a domain CG to store a printing character font data used for recording on the printer 3.

Each unit described as above, the aforementioned keyboard 1, the display 2, the printer 3 and the FDD 4 are connected by a bus 13, and on reset operation of such apparatus for power making and others, the CPU 10 reads a microprogram loaded beforehand in the ROM 11 through the bus 13, runs the program accordingly, analyzes an input designation coming, if any, from the keyboard 1, displays input characters, texts and so forth, if necessary, on the display 2, and controls an operation of the printer 3, as occasion demands, to record desired characters, texts and others or stores them in the RAM 12, thus operating the apparatus as a whole.

Figure 4:
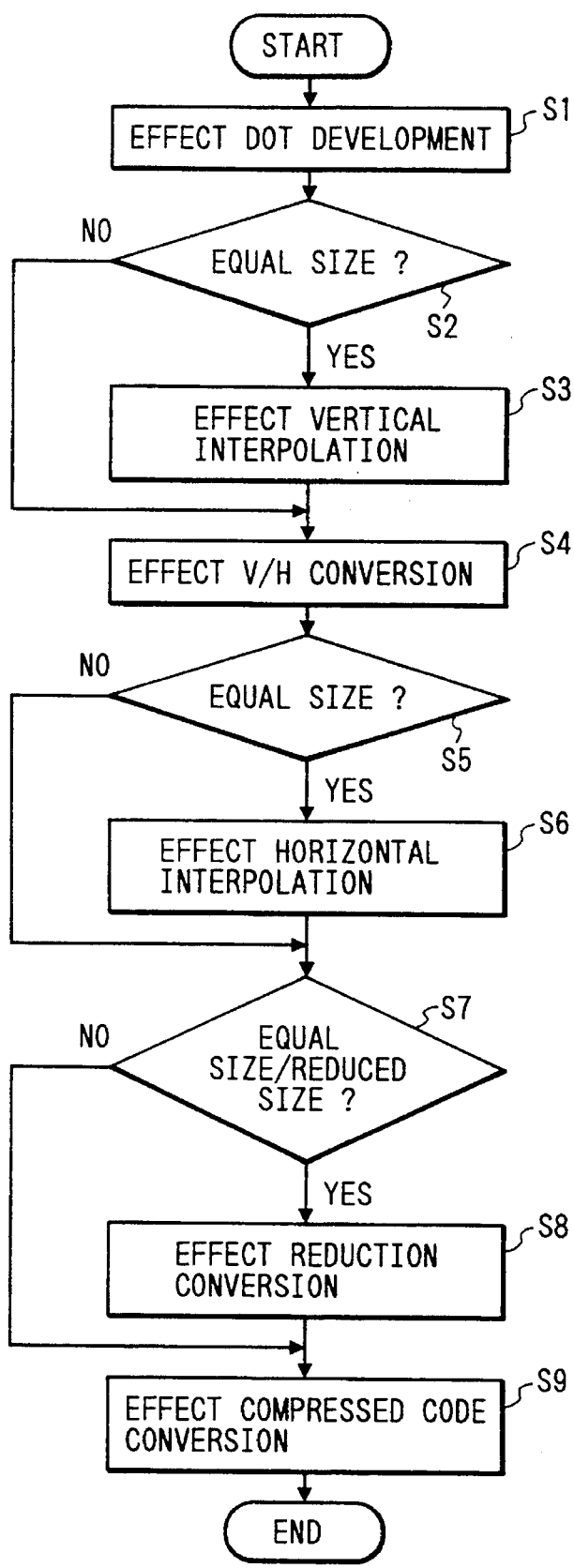
FIG. 4 is a flowchart of a process for converting a dot pattern density.

FIG. 4 is a flowchart showing a control program loaded in the ROM 11 illustrated in FIG. 3.

In step S1, an inputted/edited text to be transmitted is read from the RAM 12 or the FDD 4, and characters in the text are referred, at a predetermined number of lines, or at every line for example, to the printing font data (CG) loaded beforehand in the ROM 11 correspondingly to the character code, thereby effecting a dot development as a print image to the RAM 12. Then, in step S2, whether or not the specified state is equal size is decided, and if it comes in reduced size and enlarged size as a result, the flow proceeds to step S4. If equal size, then the flow proceeds to step S3, and in step S3, a vertical dot density of the print image developed in step S1 is enlarged by a vertical interpolation ratio/regulation described hereinlater (the picture element being increased) so as to convert into a vertical dot density of a facsimile image through a reduction conversion to be effected in a later step S8. In the present embodiment, for example, since a dot density of the print image is 360 dots/inch (hereinafter called dpi), the density is enlarged to about 400 dpi by the process. Then, in step S4, while the image data developed and interpolated in step S1 and step S3 has been developed as a vertical bit data, the facsimile image is a horizontal bit data, therefore a bit vertical/horizontal conversion is effected to generate a horizontal image data. Then, in step S5, whether or not the specified state is an equal size, and if it comes in reduced size and enlarged size, the flow proceeds to step S7. If equal size on the other hand, then the flow proceeds to step S6, and in step S6, a horizontal dot density of the horizontal image data generated in step S4 is enlarged by a horizontal interpolation ratio/regulation described hereinlater (the picture element being increased) so as to convert into a horizontal dot density of the facsimile image through the reduction conversion to be effected in the later step S8. For example, since a dot density of the source print image is 360 dpi in the embodiment, the density is enlarged to about 400 dpi by the process. Then in step S7, whether or not the specified stage is equal size or reduced size is decided, and if it is an enlarged size as a result, then the flow proceeds to step S9. On the other hand, if it comes in equal size or reduced size, then the flow proceeds to step S8, and in step S8, the horizontal image generated in step S4 or step S6 is reduced both horizontally and vertically so as to meet a size of the facsimile image. Then, the reduction ratio is specified at (1/N) times (N being an integer greater than 1) and at (½) times particularly in the present embodiment. Further, the reduction is effected not by a simple reduction method but by a method of compressing a binary image as keeping a strong point of the source image, which will be particularized hereinlater. Then, in step S9, the horizontal image data generated in step S4 or step S8 is converted into an encoded compressed code such as, for example, MH code or the like so as to be transmitted through a facsimile circuit, the compressed code is stored in the RAM 12 or the FDD 4 as occasion demands, and texts and others which are inputted and edited on such apparatus are transmitted to a desired remote facsimile by way of the facsimile communication unit 5.

As described above, operations of step S1 to step S9 are repeated at every determined number of lines of the texts and others to be transmitted, the compressed code thus generated is transmitted on occasion or is stored to transmission at every predetermined quantity, thus providing a facsimile transmission function.

Described next is a dot density conversion from a print image data into a facsimile image data.

(1) Vertical Interpolation

A dot density of the printer 3 of the embodiment is 360 dpi. On the other hand, a vertical dot density of the facsimile is about 200 dpi, and is 7.7 dots/mm or 195.6 dpi where a resolution is fine. If the dot density is converted from 360 dpi into 195.6 dpi directly, 24 vertical dots of the print image may be reduced to 13 vertical dots of the facsimile image, and as a result, picture elements will irregularly he thinned out according to such system, and thus the converted image will deteriorate. Now, therefore, the print image is first enlarged before reduction so as to effect reduction at 1/N times (N being integer).

That is, the print image is enlarged from 360 dpi to 390 dpi vertically, thereby converting 12 vertical dots into 13 dots. Then, in reducing the converted image by half, the vertical dot density is converted as 360 dpi→390 dpi→195 dpi.

Next, a vertical interpolation will be described in detail with reference to FIGS. 5A, 5B.

Figure 5A:
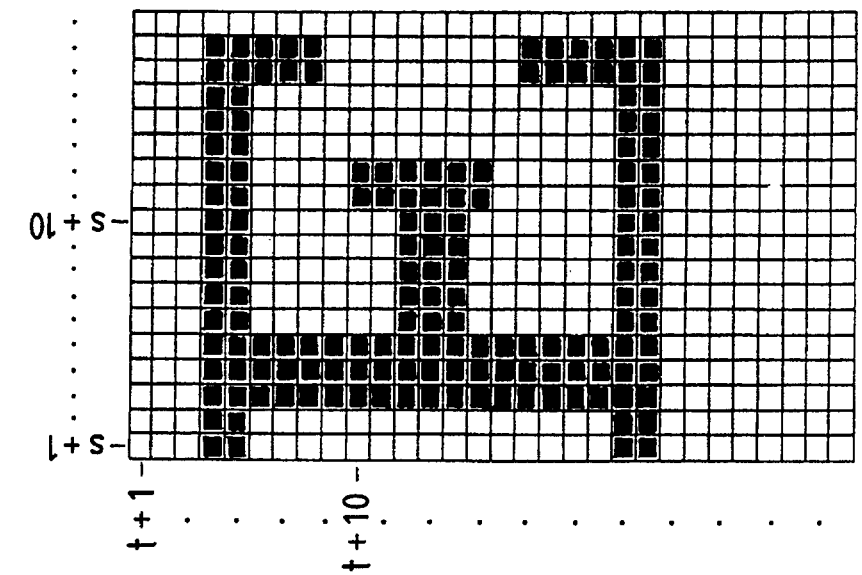
FIGS. 5A, 5B and 5C are drawings for illustrating a dot density conversion.
Figure 5B:
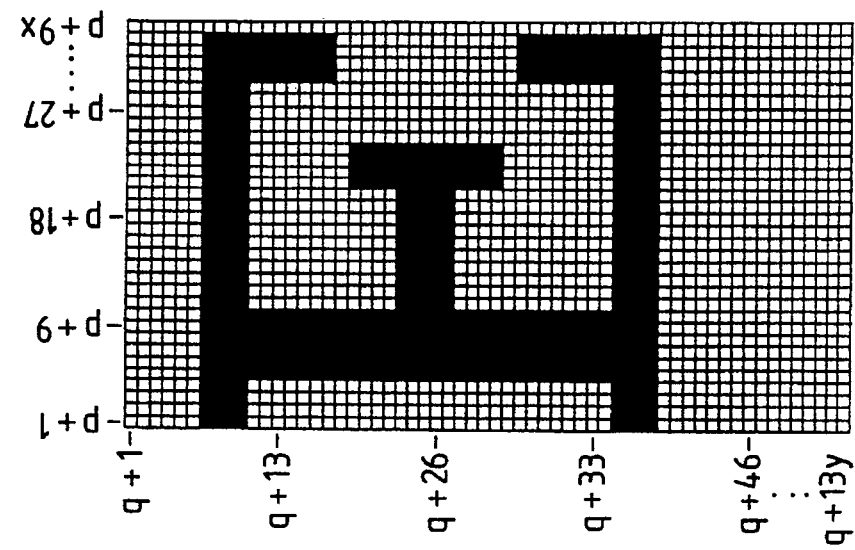

FIG. 5A shows character font data for printing the character "E", and FIG. 5B exemplifies the case where the aforementioned data is enlarged both. vertically and horizontally.

As described above, the vertical interpolation is that of enlarging 12 dots to 13 dots, so that the image in coordinates (n+1, m+1) to (n+8x, m+12) of FIG. 5A is converted into coordinates (p+1, q+1) to (p+8x, q+12), and the image in (n+1, m+12) to (n+8x, m+12) is converted to be (p+1, q+13) to (p+8x, q+13). That is, the image in coordinates (n+1, m+12y) to (n+8x, m+12y+12) of FIG. 5A is converted to be coordinates (p+1, q+13y) to (p+8x, q+13y+12) of FIG. 5B, and that in (n+1, m+12y+12) to (n+8x, m+12y+12) is converted to be (p+1, q+13y+13) to (p+8x, q+13y+13), thus effecting the vertical interpolation.

(2) Horizontal Interpolation

A dot density of the printer 3 of the present embodiment is 360 dpi. On the other hand, a horizontal dot density of the facsimile is about 200 dpi, and when the recording paper is of A4 size, a resolution is 1728 picture elements/recording paper width, namely 203.2 dpi. If the dot density is converted from 360 dpi into 203.2 dpi directly, 16 horizontal dots of the print image may be reduced to 9 horizontal dots of the facsimile image, and as a result, picture elements will be thinned out irregularly according to such system, and thus the converted image will deteriorate. Now, therefore, the print image is enlarged before reduction so as to effect reduction at 1/N times according to the embodiment. That is, the print image is enlarged from 360 dpi to 405 dpi, thereby converting horizontal 8 dots into 9 dots. Then, from reducing the converted image half, the horizontal dot density is converted as 360 dpi→405 dpi43 202.5 dpi.

Next, a horizontal interpolation will be described in detail with reference to FIGS. 5A, 5B.

FIG. 5A shows a character font data for printing the character "E", and FIG. 5B shows the data enlarged both vertically and horizontally.

As described above, the horizontal interpolation is that for enlarging 8 dots to 9 dots in the embodiment, whereby the image in coordinates (n+1, m+1) to (n+8, m+12y) of FIG. 5A is converted to be coordinates (p+1, q+1) to (p+8, q+12y) of FIG. 5B, and the image in (n+8, m+1) to (n+8, m+12y) is converted to be (p+9, q+1) to (p+9, q+12y). That is, the horizontal interpolation is effected to convert the image in coordinates (n+8x, m+1) to (n+8x+8, m+12y) of FIG. 5A to be coordinates (p+9x, q+1) to (p+9x+8, q+12y) of FIG. 5B, and that in (n+8x+8, m+1) to (n+8x+8, m+12y) to be (p+9x+9, q+1) to (p+9x+9, q+12y).

(3) Half Reduction Conversion

Figure 5C:
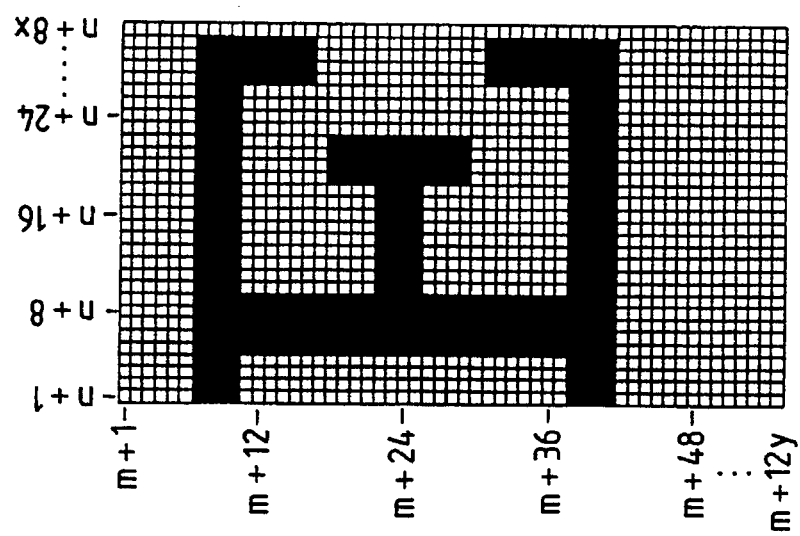

A half reduction refers to that in which an image data is reduced horizontally and vertically, reducing 4 picture elements on in coordinates (p+2x, q+2y) to (p+2x+1), (q+2y+1) of FIG. 5B to 1 picture element on coordinates (s+x, t+y) of FIG. 5C.

Figure 6:
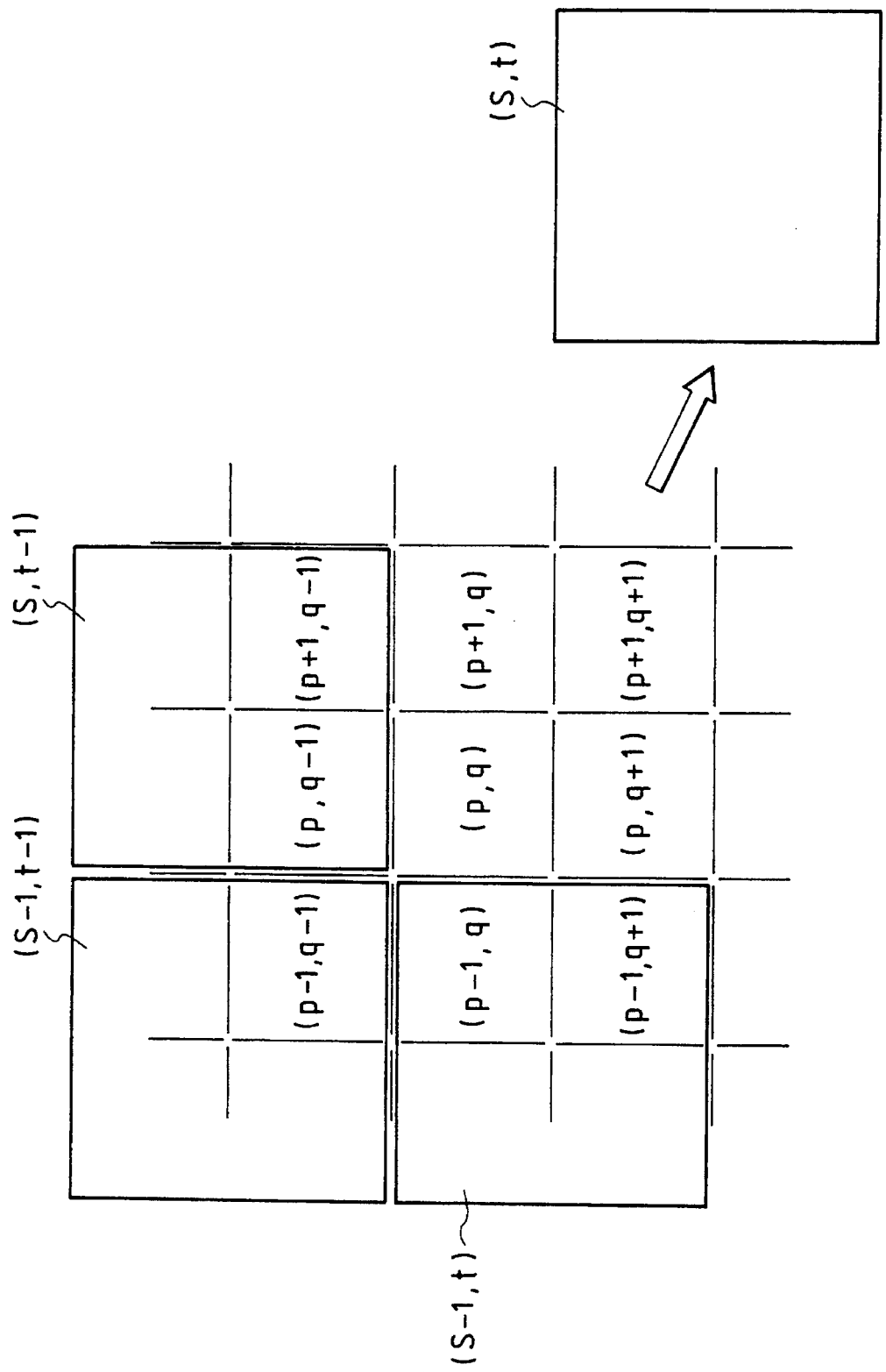
FIG. 6 is a drawing for illustrating a reduction conversion.

FIG. 6 is a drawing for illustrating an algorithm for the aforementioned reduction.

The labelling coordinates (p−1, q−1) to (p+1, q+1) in FIG. 6 indicates picture elements of a source image data for reduction, and that on (s−1, t−1) to (s, t) indicates picture elements of a reduced image data. For example, for reducing four picture elements on (p, q), (p+1, q), (p, q+1), (p+1, q+1) to a picture element on (s, t), a black-and-white state of the (s, t) picture element as reduced will be determined according to combinations conceivable in 4,096 ways from a state of 12 picture elements including 5 picture elements (p−1, q−1), (p, q−1), (p+1, q−1), (p−1, q), (p−1, q+1) around the source image and 3 picture elements (s−1, t−1), (s, t−1), (s−1, t) already reduced. Thus, in case the source image is constructed of one dot like a linear image, a linear data element may be saved in the reduced image.

Second Embodiment

In the first embodiment, characters and symbols used for printing out texts and others which are inputted and edited by such apparatus have been described with reference to the apparatus with printing font data constructed of dots in vertically-oriented bits.

However, there may be a case where a bit orientation of the printing font data varies according to a printer used on such apparatus.

For example, there is a case where bits of the character font data may be oriented horizontally in a printer such as shuttle printer or the like operating for printing and recording of characters, symbols and so forth on a plurality of lines by shifting a recording paper vertically with respect to the lines on which dots are developed and recorded, and a so-called page printer such as laser beam printer (LBP).

Now, an example wherein the present invention is applied to the apparatus mentioned as above will be described here.

In this connection, a construction of such apparatus is identical to that of the first embodiment, therefore a further description is omitted.

In case a printing character font data of such apparatus is constructed in a horizontal bit orientation, vertical/horizontal conversion operation in step S4 of the control flowchart of the first embodiment given in FIG. 4 is not effected, and a conversion process is carried out in the procedure coming in step S1 to step S3, and step S5 to step S9.

Third Embodiment

In the first embodiment and the second embodiment, the description has referred to a case where a print image is developed by the CPU 10, a conversion operation is effected according to step S2 to step S9 of the flowchart given in FIG. 4, and after a facsimile transmission image is generated, desired texts and others are transmitted as images to a desired remote facsimile by controlling the facsimile communication unit 5.

In consideration of a processing time of the CPU 10 at the time of transmission from the aforementioned apparatus to a facsimile, it is found that the printing development operation described in step 1 of the flowchart of FIG. 4 and the conversion operation of step 2 to step 9 take a long time for processing. Thus, texts cannot be edited or prepared on the text processing apparatus during transmission.

Figure 7:
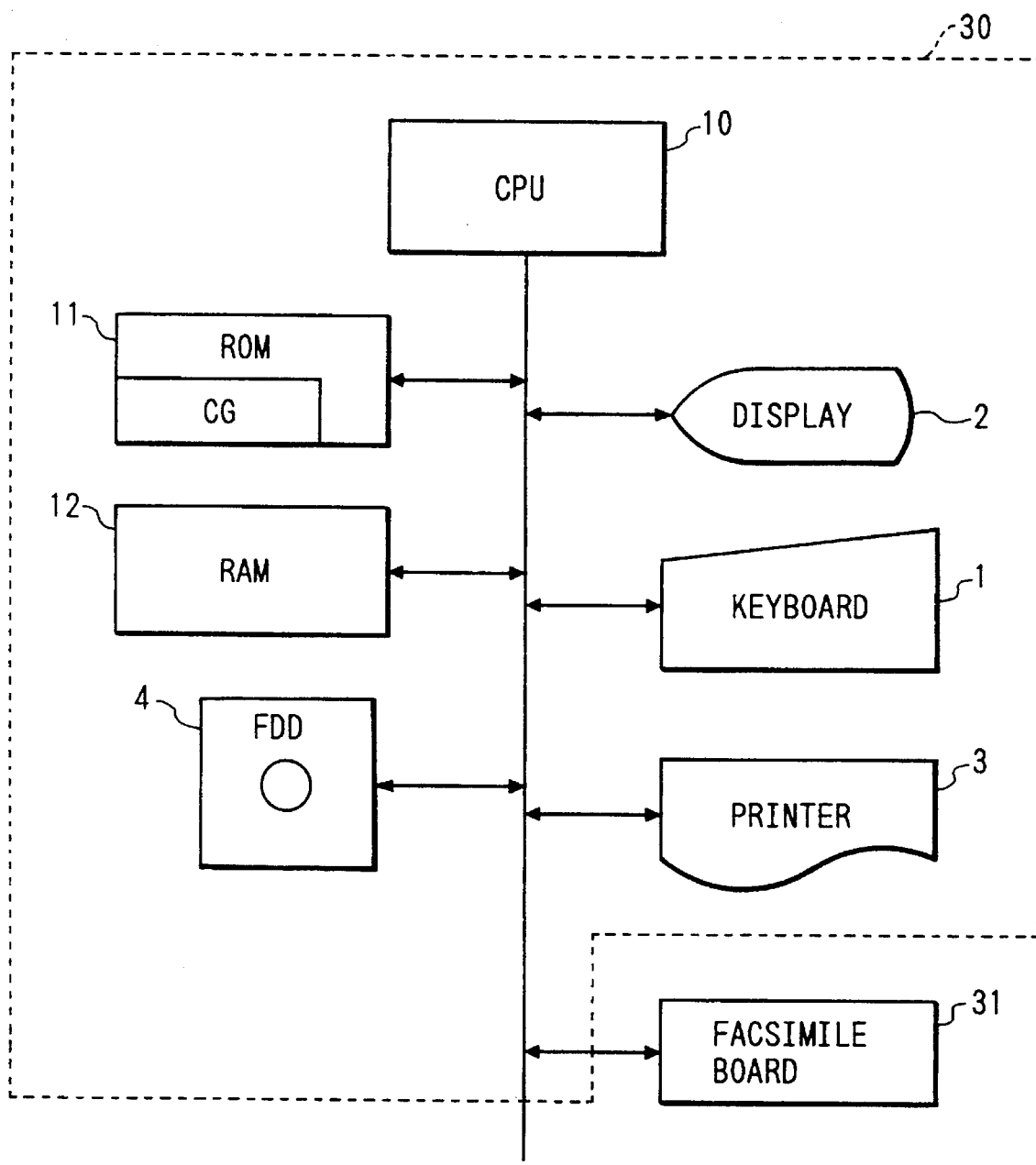
FIG. 7 is a drawing showing a hardware configuration of a text processing apparatus given in another embodiment.

Now, therefore, in the present embodiment, a facsimile board 31 operating for the aforementioned conversion process and transmission control to a facsimile is isolated as another apparatus as shown in FIG. 7, thereby lightening a load on the CPU 10 of the apparatus. Such example will be described.

Then, like reference numerals represent like parts in the foregoing embodiments, and hence a further description will be omitted here.

Figure 8:
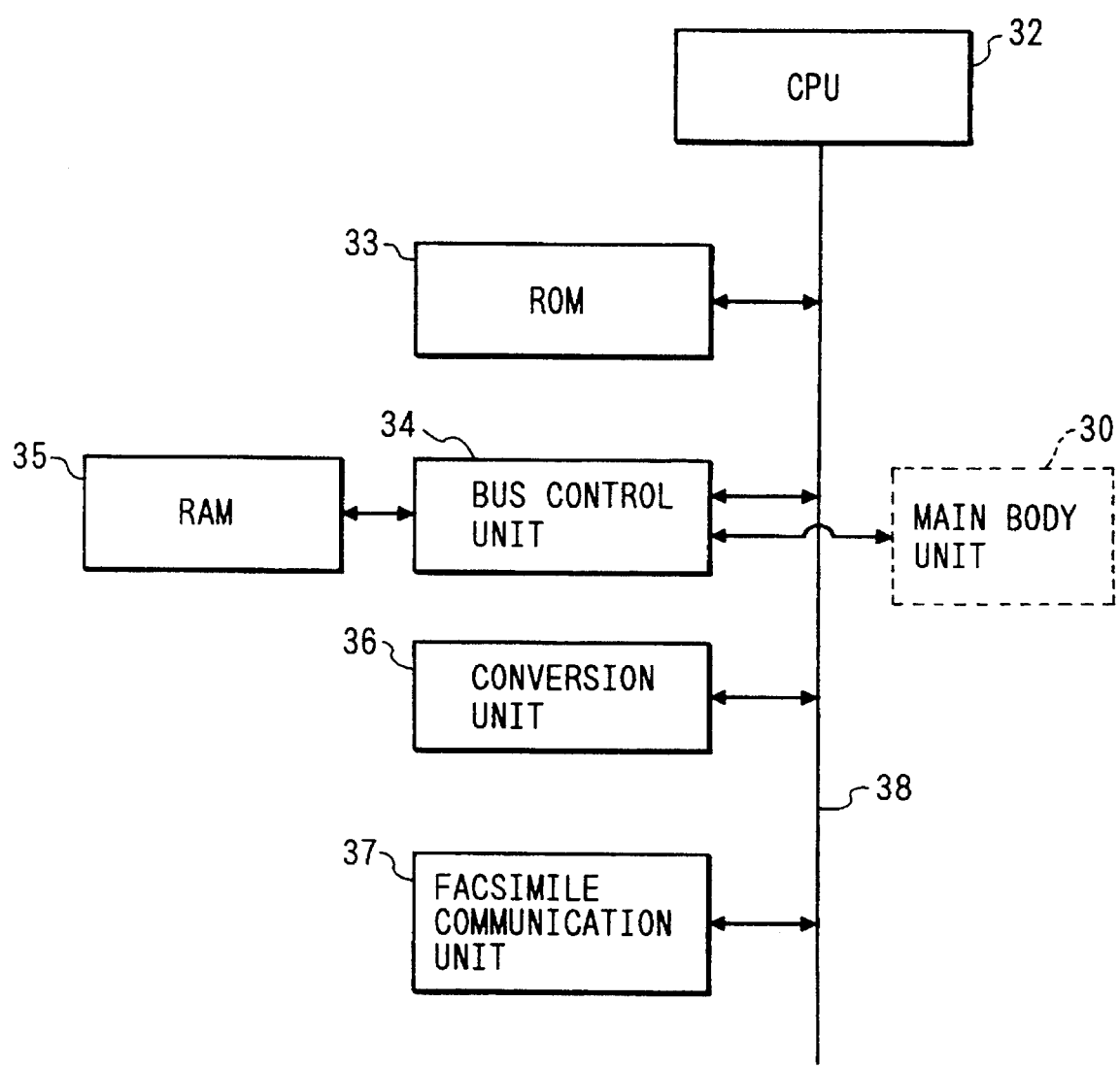
FIG. 8 is a block diagram showing a construction of a facsimile board.

FIG. 8 shows a construction of the facsimile board 31 illustrated in FIG. 7.

A reference numeral 32 denotes a microcomputer (CPU), 37 denotes a facsimile communication unit constructed of MODEM, NCU and others operating for communication described in the communication unit 25 of the foregoing embodiment, 36 denotes a conversion unit operating for vertical interpolation, horizontal interpolation, vertical/horizontal conversion, reduction conversion described in the foregoing embodiment, 35 denotes a random access memory (RAM), which is capable of storing a predetermined content while a program is run. A reference numeral 33 denotes an ROM, storing the program described in step S2 to step S9 of FIG. 4 and the program for communication control of the facsimile described in the aforementioned embodiment. A reference numeral 34 denotes a bus control unit for selecting which portion of the CPU 32 and the conversion unit 36 or a main body unit 30 side will read and write the RAM 35. The above-described units are connected each by a CPU bus 38, and according to a reset operation of the main body unit 30 by a power making of such apparatus, the CPU 32 reads a microprogram loaded beforehand in the ROM 33 through the CPU bus 38, runs the program accordingly and when receiving an image conversion designation, a transmission designation to a facsimile and so forth from the main body unit 30, operates for image conversion control, communication control of a facsimile circuit and so forth accordingly.

A specified state of sizes to vary is stored in the RAM 12 of the main body unit 30, thereby identifying the specified state through the conversion control operation.

Figure 9:
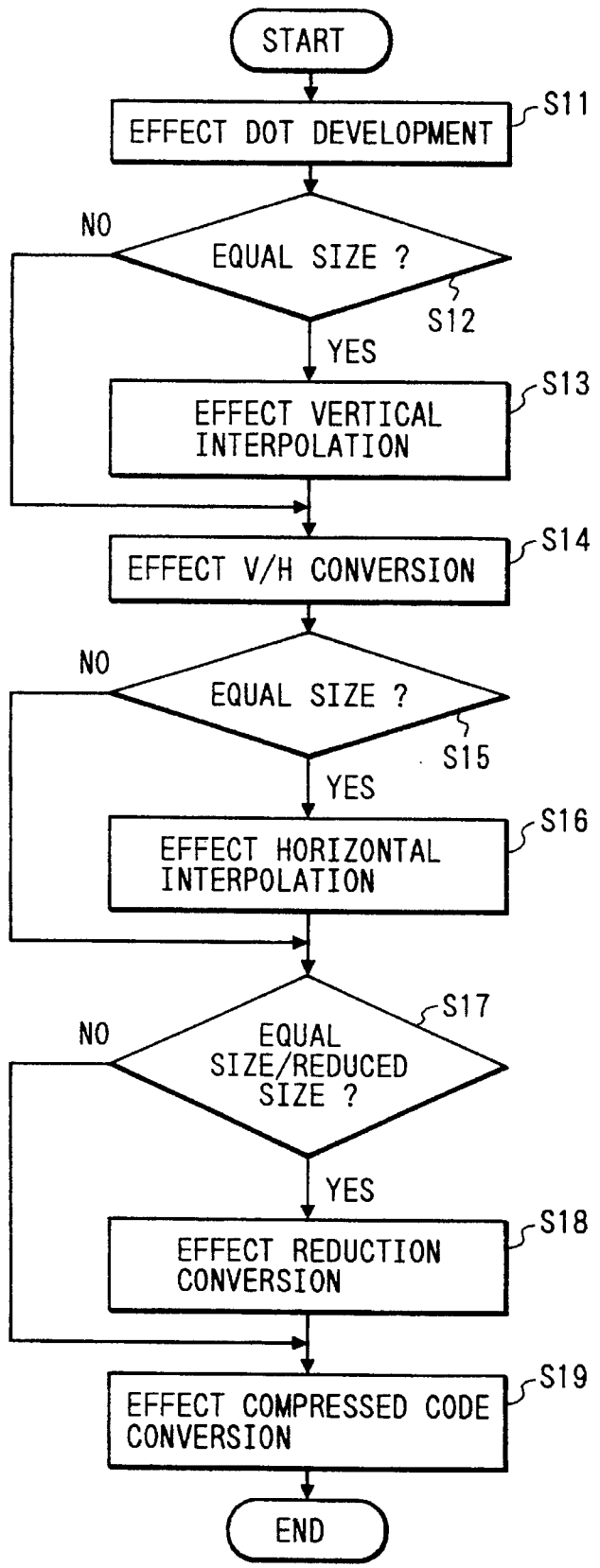
FIG. 9 is a flowchart of a process for converting a dot pattern density in the other embodiment.

FIG. 9 is a flowchart showing a control program loaded in the ROM's 11 and 33.

In step S11, the main body unit 30 reads an inputted and edited text to be transmitted as desired from the RAM 12 or the FDD 4, effects a dot development of a print image to the RAM 35 and others through the bus control unit 34 of the facsimile board 31 at every predetermined number of lines, or at every line for example, in referring to the printing font data (CG) loaded beforehand in the ROM 11 corresponding to a character code in the text, and provides an image conversion designation to the CPU 32 of the facsimile board 31 and others. Then, since the CPU 10 of the main body unit 30 discontinues the process after step S2, the CPU 10 is ready for processing other services. In step S12 to step S19, the CPU 32 of the facsimile board 31 decides whether or not the specified state is equal size in step S12 as in the case of the foregoing embodiment, and if reduced size and enlarged size, then the flow proceeds to step S14. If it is equal size, the flow proceeds to step S13, and in step S13, the size is enlarged by the aforementioned vertical interpolation so as to convert a vertical dot density of the print image developed in step S11 into a vertical dot density of the facsimile image through a reduction process of step S18 described hereinlater. In step S14, a vertical/horizontal conversion is effected as in the case of the foregoing embodiment, and thus a horizontal image data is generated. In step S15, whether or not the specified state is an equal size is decided, and if reduced size and enlarged size, then the flow proceeds to step S17. On the other hand, if it is the equal size, the flow proceeds to step S16, and in step S16, the size is enlarged by the aforementioned horizontal interpolation so as to convert a horizontal dot density of the horizontal image data generated in step S14 into a horizontal dot density of the facsimile image through a reduction process of step S18 described hereinlater. In step S17, whether or not the specified state is an equal size or a reduced size is decided, and if enlarged size, then the flow proceeds to step S19. On the other hand, if it is the equal size or the reduced size, the flow proceeds to step S18, and in step S18, the size is reduced both horizontally and vertically as in the case of the foregoing embodiment so as to adapt the horizontal image generated in step S14 or step S16 to a size of the facsimile image. Then, in step S19, the horizontal image data generated in step S14 or step S18 is converted into an encoded compressed code such as, for example, MH code or the like so as to transmit it through a facsimile circuit, and the compressed code is stored in the RAM 35, or the RAM 12 of the main body unit 30, or the FDD 4 as occasion demands, thus transmitting texts and others which are inputted and edited by the main body unit 30 of such apparatus to a desired remote facsimile.

Upon detection of a state where the image data designated by the main body unit 30 is empty in step S19, the CPU 32 of the facsimile board will report a conversion process to the main body unit 30. Then, the main body unit 30 recognizes the conversion end report by interruption and others, and repeats the operation of step S11 as occasion demands.

As described above, operations of step S11 to step S19 are repeated at every predetermined number of lines of texts and others to be transmitted, and compressed codes thus generated are transmitted as occasion demands or stored to transmit at every predetermined quantity, and such facsimile transmission function is available to realizing a text processing apparatus capable of effecting other services such as text preparation, editing and the like in parallel with a transmitting operation to facsimile.

Fourth Embodiment

In the first embodiment to the third embodiment, while the description has referred to the printer 3 exemplified by a dot matrix printer wherein characters, symbols and others are constructed of dots 360 dpi in density both vertically and horizontally, a dot density of the printer 3 must be increased and a further precise dot matrix printer must be employed for printing and recording texts and others which are edited by such apparatus more clearly.

Now, therefore, in the present embodiment, the description refers to a case where employed is a dot matrix printer wherein a horizontal/vertical dot density is 720 dpi double of the foregoing embodiment to construct characters, symbols and others.

Then, such apparatus of the embodiment is different only in dot density of the printer 3 from the foregoing embodiment, and identical in construction to other apparatuses.

What is different from the foregoing embodiment will be taken up for description here.

(1) While a dot density of the print image data in step S1 is 360 dpi in the foregoing embodiment, it is 720 dpi in the present embodiment.

(2) A vertical dot density is increased from 720 dpi to 780 dpi by the vertical interpolation operation in step S3, that is vertically-oriented dots of a source image are enlarged from 12 dots to 13 dots.

(3) A horizontal dot density is increased from 720 dpi to 810 dpi by the horizontal interpolation operation in step S6, that is, horizontally-oriented dots of a source image are enlarged from 8 dots to 9 dots.

(4) From effecting the reduction conversion in step S8 by ¼ times, that is, effecting the half reduction algorithm illustrated in FIG. 6 twice, the vertical dot density is converted as 780 dpi→ 390 dpi→195 dpi, and the horizontal dot density is converted as 810 dpi→405 dpi→202.5 dpi.

Thus, even from using such printer highly precise in dot density on the apparatus, a facsimile image data can be generated from the print image data, and texts and others prepared by such apparatus can be transmitted to a desired remote facsimile.

As described above, inputted and edited texts can be outputted to a desired facsimile as images same in size as the outputted print image.

Further, the construction of the present invention is ready for coping with a case where characters usable for inputting texts and others are increased in kind, size and the like.

Still further, the printing character font data is able to cope simply be to cope with the increased font in such case. Therefore an extra cost for coping with the facsimile transmitting function will not particularly be required.

What is claimed is:

1. A text transmitting method comprising the steps of:

storing characters constructing a text in a character code;

developing the character code into a first dot pattern having a first horizontal dot density and a first vertical dot density;

converting the first dot pattern into a second dot pattern having a second horizontal dot density and a second vertical dot density, wherein the first horizontal dot density is higher than the second horizontal dot density and is not an integer multiple of the second horizontal dot density, and the first vertical dot density is higher than the second vertical dot density and is not an integer multiple of the second vertical dot density; and transmitting the text comprising characters each represented by the second dot pattern having the second horizontal and vertical dot densities, wherein said converting step includes:

enlarging the first dot pattern into a third dot pattern having a third horizontal dot density which is a first integer multiple of the second horizontal dot density, the third dot pattern having a third vertical dot density which is a second integer multiple of the second vertical dot density;

storing the third dot pattern; and reducing the third dot pattern into the second dot pattern by dividing the third dot pattern into equal blocks each having a number of dots in the horizontal direction equal to the first integer and a number of dots in the vertical direction equal to the second integer, and by compressing each block in the third dot pattern to one dot in the second dot pattern.

2. The method as defined in claim 1, wherein, in said reducing step, a horizontal size varying rate is independent of a vertical size varying rate.

3. The method as defined in claim 1, wherein a value of the one dot for each block is determined on the basis of the dot pattern of the respective block and surrounding pixels thereof.

4. The method as defined in claim 3, wherein the value of the one dot is further determined on the basis of a dot pattern of pixels surrounding the one dot in the second dot pattern.

5. A text transmitting apparatus comprising:

input means for inputting characters;

memory means for storing a text comprising the characters inputted from said input means in a character code;

development means for developing said character code into a first dot pattern having a first dot horizontal density and a first vertical dot density;

conversion means for converting the first dot pattern horizontal dot density and a second vertical dot density, wherein the first horizontal dot density is higher than the second horizontal dot density and is not an integer multiple of the second horizontal dot density, and the first vertical dot density is higher than the second vertical dot density and is not an integer multiple of the second vertical dot density; and transmission control means for controlling transmission of the text comprising characters each represented by the second dot pattern having the second horizontal and vertical dot densities, wherein said conversion means includes:

enlarging means for enlarging the first dot pattern into a third dot pattern having a third horizontal dot density which is a first integer multiple of the second horizontal dot density, the third dot pattern having a third vertical dot density which is a second integer multiple of the second vertical dot density;

memory means for storing the third dot pattern; and reduction means for reducing the third dot pattern into the second dot pattern by dividing the third dot pattern into equal blocky each having a number of dots in the horizontal direction equal to the first integer and a number of dots in the vertical direction equal to the second integer, and by compressing each block in the third dot pattern to one dot in the second dot pattern.

6. The text transmitting apparatus as defined in claim 5, wherein a horizontal size varying rate for conversion by said conversion means is independent of a vertical size varying rate therefor.

7. The text transmitting apparatus as defined in claim 5, wherein a value of the one dot for each block is determined on the basis of the dot pattern of the respective block and surrounding pixels thereof.

8. The text transmitting apparatus as defined in claim 7, wherein the value of the one dot is further determined on the basis of a dot pattern of pixels surrounding the one dot in the second dot pattern.

\* \* \* \* \*

UNITED STATES PATENT AND TRADEMARK OFFICE
CERTIFICATE OF CORRECTION

PATENT NO. : 5,522,023
DATED : May 28, 1996
INVENTOR(S) : TETSUYA KAWANABE ET AL.    Page 1 of 2

It is certified that error appears in the above-identified patent and that said Letters Patent is hereby corrected as shown below:

COLUMN 1

Line 12, "b" should read --the--.

COLUMN 5

Line 58, "half," should read --by half,--.
Line 59, "405 dpi43 202.5 dpi." should read
--405 dpi→202.5 dpi.--.

COLUMN 7

Line 2, "step 1" should read --step S1--.
Line 3, "step 2 to step 9" should read
--step S2 to step S9--.

COLUMN 8

Line 55, "720 dpi double" should read
--720 dpi, double that--.

COLUMN 9

Line 24, "be to cope" should be deleted.

UNITED STATES PATENT AND TRADEMARK OFFICE
CERTIFICATE OF CORRECTION

PATENT NO. : 5,522,023
DATED      : May 28, 1996
INVENTOR(S): TETSUYA KAWANABE ET AL.

It is certified that error appears in the above-identified patent and that said Letters Patent is hereby corrected as shown below:

COLUMN 10

Line 16, "dot horizontal" should read --horizontal dot--.
Line 41, "blocky" should read -blocks--.

Signed and Sealed this

Twenty-fourth Day of September, 1996

BRUCE LEHMAN

Attest:

Attesting Officer

Commissioner of Patents and Trademarks